United States Patent
Speks et al.

(10) Patent No.: US 7,512,073 B2
(45) Date of Patent: Mar. 31, 2009

(54) METHOD AND SIGNALING NODE FOR REDUCING SIGNALING DURING CALL SETUP

(75) Inventors: Oliver Speks, Eschweiler (DE); Henning Brandes, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 594 days.

(21) Appl. No.: 11/227,772

(22) Filed: Sep. 14, 2005

(65) Prior Publication Data

US 2007/0058549 A1 Mar. 15, 2007

(51) Int. Cl.
*H04L 12/26* (2006.01)
(52) U.S. Cl. .......... 370/236; 370/282; 379/93.14; 379/229
(58) Field of Classification Search .......... 370/236, 370/522; 379/229
See application file for complete search history.

(56) References Cited

U.S. PATENT DOCUMENTS 5,805,675 A * 9/1998 Chanda .......... 379/93.14
6,996,225 B1 * 2/2006 Bordonaro et al. .......... 379/229
7,310,694 B2 * 12/2007 Han et al. .......... 710/106
2005/0181782 A1 * 8/2005 Hollis et al. .......... 455/424

* cited by examiner

*Primary Examiner*—Chi H Pham
*Assistant Examiner*—Albert T Chou
(74) *Attorney, Agent, or Firm*—Thomas Bethea, Jr.

(57) ABSTRACT

A method and a signaling node for reducing signaling during call setup in a communication network. The signaling node is an intermediate node on a signaling path between an origination node and a destination node. When a call setup delay is experienced, the intermediate node receives a first excessive delay indication signal from the destination node and forwards the signal to the origination node. A timer for supervising excessive delay indication signals is then started in the intermediate node. Prior to expiration of the timer, additional excessive delay indication signals received from the destination node are not forwarded. After expiration of the timer, the intermediate node sends a single excessive delay indication signal to the origination node.

23 Claims, 7 Drawing Sheets

METHOD AND SIGNALING NODE FOR REDUCING SIGNALING DURING CALL SETUP

FIELD OF THE INVENTION

This invention relates to a method and a signaling node for reducing a signaling load in a communications network during call setup. In particular the invention relates to a method and a signaling node for reducing the number of excessive delay signals during call setup.

BACKGROUND OF THE INVENTION

To establish a call connection in a communication network, a call setup procedure must be performed to determine the transmission route for the call connection and to reserve network resources for the call connection.

A call setup can be delayed for various reasons. A signaling route may be congested causing a signaling node to perform a scanning or a polling attempt in the communication network; network resources may be occupied by ongoing call connections; or, in a mobile communications network, establishment of a radio link may be delayed.

To avoid assigning resources to a call that is never completed, the duration of the call setup is supervised. To that end call setup supervision timers are provided in communication networks. When a call originating node initiates a call setup procedure, and a call setup message is transmitted towards a chain of nodes that transmit the call setup message, a supervision timer is started in the call originating node and in each of the other nodes that transmit the call setup message. When a response message is not received within a predefined expiration period, the call is released. When a response message is received within the expiration time, the supervision timer is reset.

More than one supervision timer can be provided in a node. For example, in the Bearer Independent Call Control (BICC) protocol, network timers T7 and T9 may be provided. The timer T7 is started in the call originating node and in each of the chain of nodes transmitting the call setup message during the call setup when an Initial Address Message (IAM) is sent towards a call terminating node. The timer T7 is reset when an Address Complete Message (ACM) is received, indicating that a network address of the terminating node has successfully been determined. When no ACM is received during the predefined expiration time of the T7 timer, the call is released. A second timer T9 is started when the ACM message is received in the call originating node, and is reset when an Answer (ANM) message is received. When no ANM message is received within the predetermined expiration time of the T9 timer, the call is released.

To prevent releasing a call when a specific reason for the prolongation of a call setup has been determined, excessive delay indication signals have been introduced. Reasons for a prolongation of a call setup may be that the network is congested. An excessive delay timer may be provided that initiates sending of an excessive delay indication signal when the timer expires.

A first excessive delay indication signal may be embodied as an early Address Complete Message (eACM) that is formatted as an ACM message. Like an ACM message, an eACM message stops the T7 timer and starts the T9 timer. Further excessive delay indication signals may be embodied as Call Progress (CPG) messages that restart the T9 timer.

Figure 1:
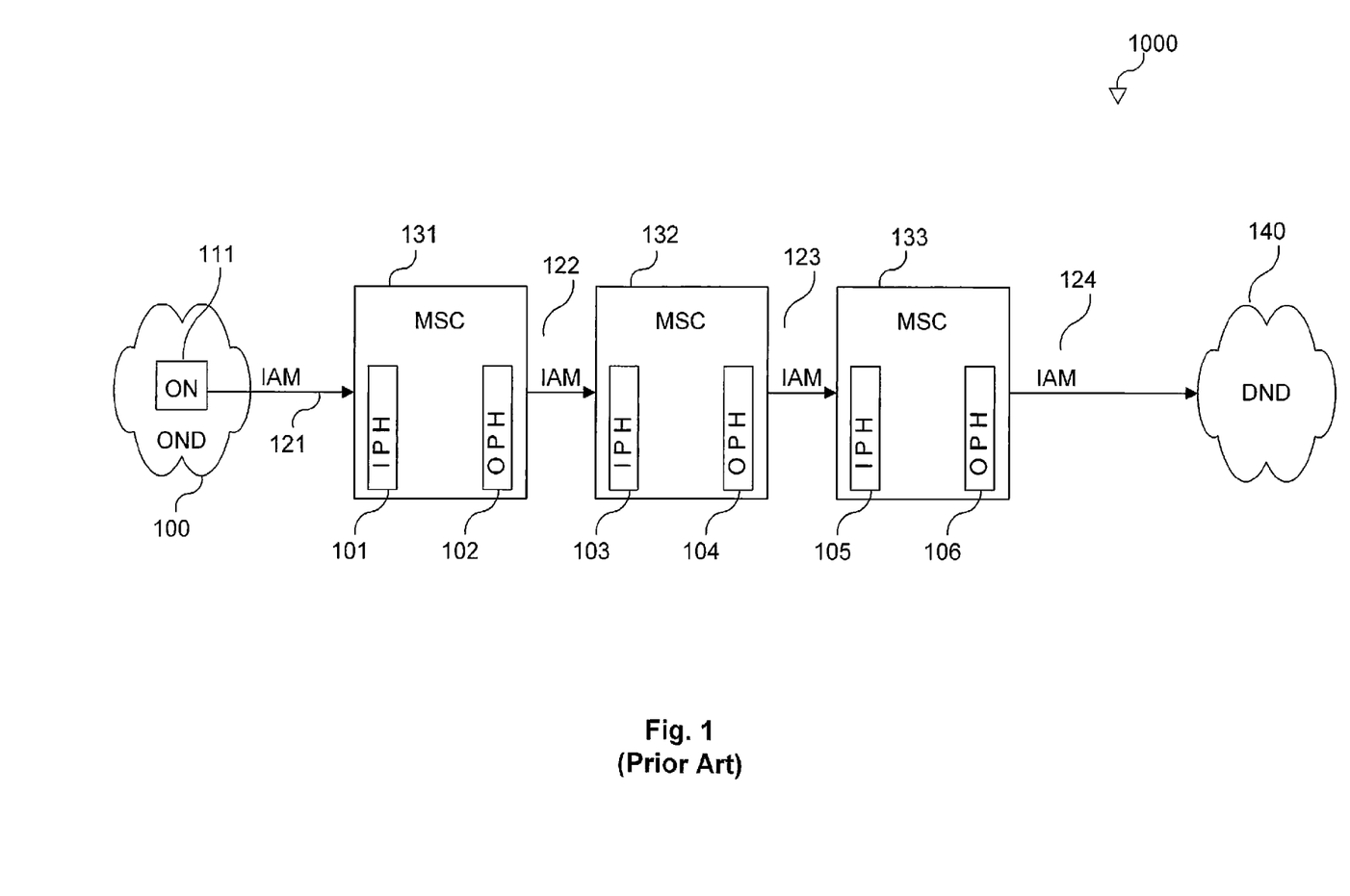
FIG. 1 (Prior Art) is a block diagram illustrating a mobile communication network.

Reference is now made to FIG. 1, which illustrates a mobile network 1000 and IAM messages sent during call setup in the mobile communication network. The mobile communication network 1000 comprises an originating node (ON) 111 within a originating network domain (OND) 100 and a destination network domain (DND) 140, that are interconnected by a plurality of Mobile Switching Centers (MSCs) 131, 132, and 133 forming a signaling path. Each of the MSCs includes an incoming protocol handler and an outgoing protocol handler. In particular, MSC 131 includes an incoming protocol handler 101 and an outgoing protocol handler 102; MSC 132 includes an incoming protocol handler 103 and an outgoing protocol handler 104; and MSC 133 includes an incoming protocol handler 105 and an outgoing protocol handler 106.

When a call is set up, the originating node 111 sends an IAM message 121 towards the destination network domain 140 and starts a supervising timer for supervising the duration of the call setup duration. The call setup is further continued by forwarding IAM messages 122, 123, and 124 towards the destination network domain 140.

Figure 2:
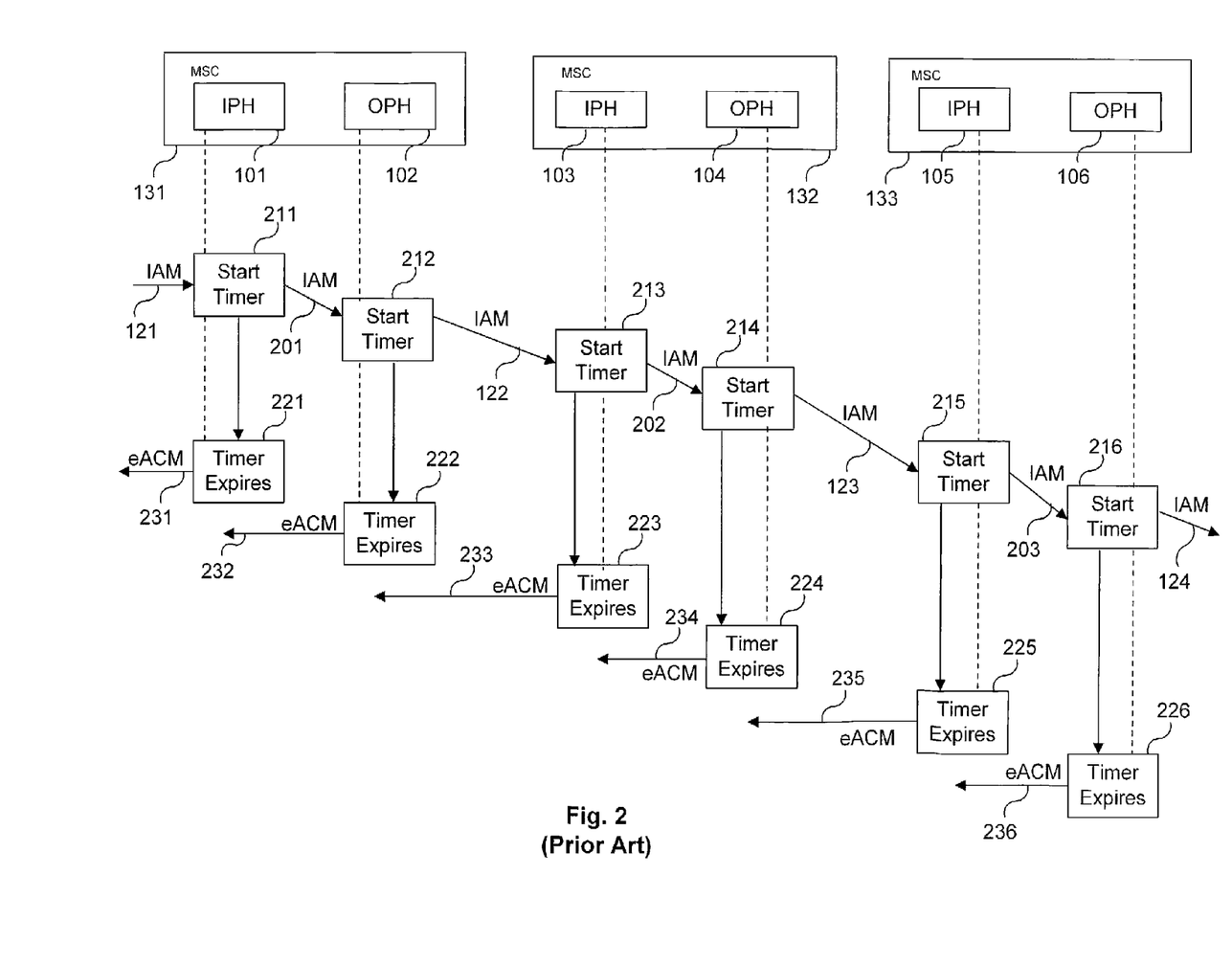
FIG. 2 (Prior Art) is a signal sequence diagram for illustrating the generation and conventional handling of excessive delay indication signals in the network of FIG. 1.

Reference is now made to FIG. 2, which is a signaling sequence diagram depicting message within the mobile network of FIG. 1. Equally labeled elements refer to the respective elements in FIG. 1. In particular, FIG. 2 depicts the transmission and processing of IAM messages within the signaling path of FIG. 1 as well as the generation and conventional handling of excessive delay indication signals.

Upon reception of the IAM 121 in the incoming protocol handler 101 of MSC 131, an excessive delay timer for initiating the generation of an excessive delay indication signal is started in step 211, and IAM message 201 is forwarded to the outgoing protocol handler 102 within MSC 131. The outgoing protocol handler, in turn, starts a further timer for generating an excessive delay indication signal in step 212, and forwards IAM message 122 to MSC 132, which receives the IAM message 122 on its incoming protocol handler 103.

In MSC 132, a corresponding procedure is performed (i.e., the incoming protocol handler 103 starts its timer for initiating the generation of excessive delay indication signals in step 213 and forwards IAM 202 to its corresponding outgoing protocol handler). The outgoing protocol handler responds by forwarding IAM message 123 towards MSC 133 and starts its associated excessive delay timer in step 214.

Correspondingly, MSC 133, receives IAM 123 on its incoming protocol handler 105, starts the associated excessive delay timer in step 215, and forwards IAM 203 internally to outgoing protocol handler 106. The outgoing protocol handler, in turn, forwards IAM 124 and starts its excessive delay timer at step 216.

Accordingly in each of the incoming and outgoing protocol handlers of MSCs 131, 132, and 133, excessive delay timers are started.

When call setup is not completed within the predetermined expiration time of one of the excessive delay timers, an excessive delay indication signal is generated within the corresponding protocol handlers. The excessive delay indication signals restart a timer in the originating node 101 and in the other transmitting nodes 132 and 133 that supervise the duration of the call setup As depicted in FIG. 2, when the timer for incoming protocol handler 101 within MSC 131 expires at step 221, an eACM message 231 indicating excessive delay is generated and transmitted towards the call-originating end of the signaling path of FIG. 1. Accordingly eACM messages 232-236, each indicating an excessive delay are generated in the protocol handlers 102-106, respectively, and are transmitted towards the call originating end of the signaling path.

Thus depending on the call setup conditions, a large number of eACM messages indicating an excessive delay can be generated and transmitted in the mobile network 1000. Sending a plurality of messages with excessive delay indication not only unnecessarily consumes signaling capacity, it can also lead to call release because the limit for the number of restarts of the timer T9 is exceeded.

Accordingly there is a need in the state of the art to limit the signaling load during a delayed call setup in a mobile communication network.

SUMMARY OF THE INVENTION

The present invention provides a method of reducing signaling during call setup in a communication network having an intermediate node on a signaling path between a first node and a second node. The invented method is performed in the intermediate node and includes sending a first excessive delay indication signal to the first node; starting a timer for supervising excessive delay indication signals; receiving at least two additional excessive delay indication signals from the second node prior to expiration of the timer; and after expiration of the timer, sending a single excessive delay indication signal to the first node.

According to a further aspect, the invention is directed to a method of reducing signaling during call setup in a communication network having an intermediate node on a signaling path between a first node and a second node. This invented method is performed in the intermediate node and includes receiving a first excessive delay indication signal from the second node; forwarding the first excessive delay indication signal to the first node; receiving at least one additional excessive delay indication signal from the second node; and discarding the at least one additional excessive delay indication signal. Thus, signaling is reduced in the network by reducing the number of excessive delay indication signals sent from the intermediate node to the first node.

In yet another aspect, the present invention is directed to a signaling node for reducing signaling during call setup in a communication network. The signaling node is an intermediate node on a signaling path between a first node and a second node. The invented signaling node includes means for sending a first excessive delay indication signal to the first node; a timer for supervising excessive delay indication signals; means for starting the timer; means for receiving at least two additional excessive delay indication signals from the second node prior to expiration of the timer; and means for sending a single excessive delay indication signal to the first node after expiration of the timer.

According to a further aspect, the signaling node includes means for receiving a first excessive delay indication signal from the second node; means for forwarding the first excessive delay indication signal to the first node; means for receiving at least one additional excessive delay indication signal from the second node; and means for discarding the at least one additional excessive delay indication signal. Thus signaling is reduced in the network by reducing the number of excessive delay indication signals sent from the signaling node to the first node.

In another aspect, the present invention is directed to a communication network with reduced signaling during call setup. The inventive communication network includes an intermediate node on a signaling path between a first node and a second node. The intermediate node includes means for sending a first excessive delay indication signal to the first node; a timer for supervising excessive delay indication signals; means for starting the timer; means for receiving at least two additional excessive delay indication signals from the second node prior to expiration of the timer; and means for sending a single excessive delay indication signal to the first node after expiration of the timer.

In a further aspect, the communication network includes an intermediate node comprising means for receiving a first excessive delay indication signal from the second node; means for forwarding the first excessive delay indication signal to the first node; means for receiving at least one additional excessive delay indication signal from the second node; and means for discarding the at least one additional excessive delay indication signal. Thus, signaling is reduced in the network by reducing the number of excessive delay indication signals sent from the signaling node to the first node.

DETAILED DESCRIPTION OF EMBODIMENTS

Figure 3:
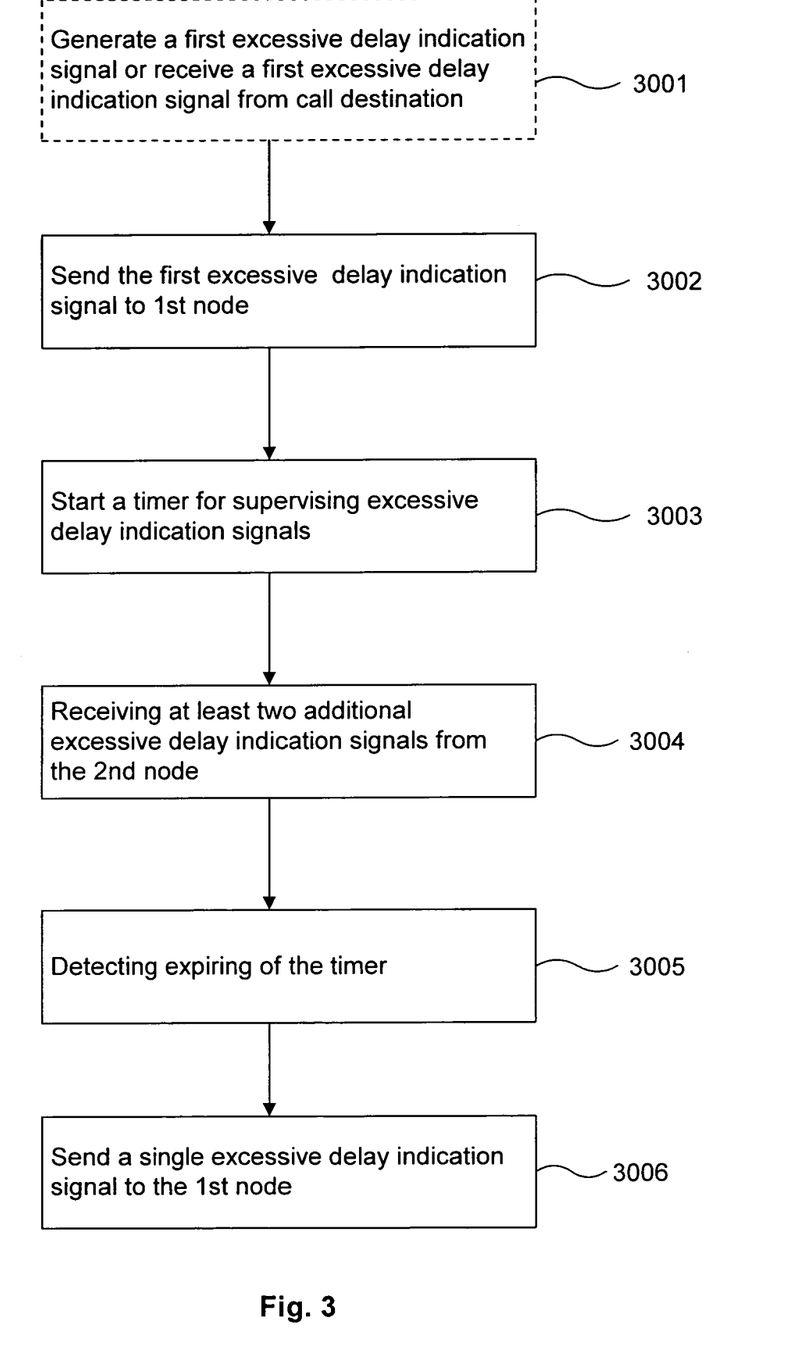
FIG. 3 is a flowchart diagram depicting an embodiment of a method in accordance with the teachings of the present invention.

FIG. 3 depicts a sequence of processing steps in accordance with the teachings of the present invention. The depicted sequence may be performed in any of the MSCs of FIG. 1, or in any other intermediate node on a signaling path between a call originating node and a call terminating node. The signaling path can be regarded from the view of the intermediate node as having a segment towards the call origin and a segment towards the call destination.

The depicted sequence starts with message sending step 3002, during which a first excessive delay indication signal is sent towards the call origin. The excessive delay indication signal may have been previously received from a node on the call destination segment of the signaling path or been previously generated within the intermediate node in step 3001.

In response to sending the excessive delay indication signal, a timer for supervising excessive delay indication signals is started in step 3003. Prior to the expiration of the timer, at least two additional excessive delay indication signals are received from the call destination segment of the signaling path in step 3004. Expiration of the timer is detected in step 3005, and, at step 3006, a single excessive delay indication signal is transmitted towards the call origin.

Figure 4:
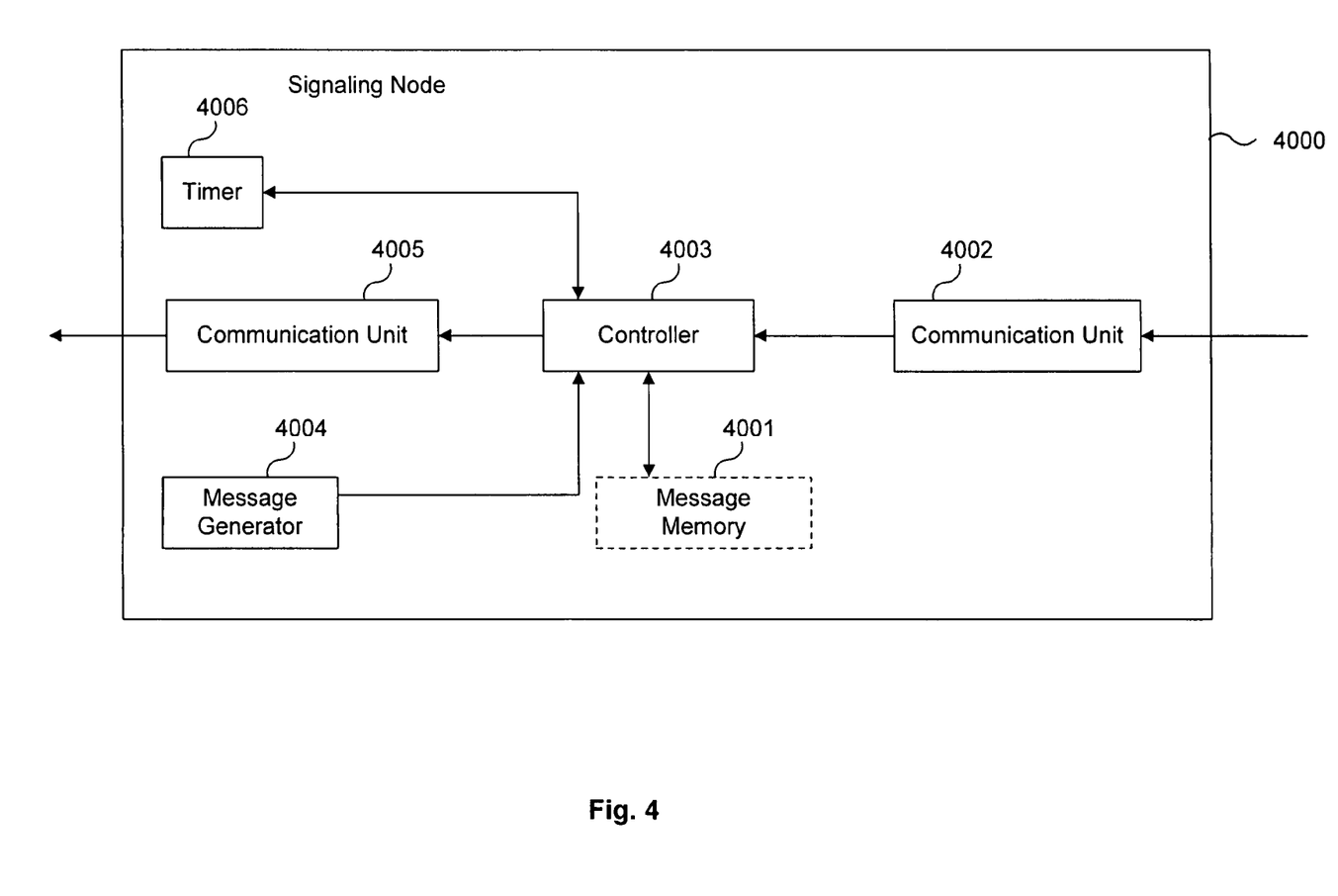
FIG. 4 is a block diagram depicting an embodiment of a signaling node in accordance with the teachings of the present invention.

Reference is now made to FIG. 4 illustrating a block diagram of a signaling node 4000 embodied to perform the method to reduce the signaling load of FIG. 3. When connected within a communication network, the signaling node 4000 may be an intermediate node on a signaling path between a call originating domain and call destination domain of the communication network. To connect the signaling node 4000 within such a communication network, communication units 4005, 4002 are provided. Communication unit 4005 may connect the signaling node 4000 towards the call originating segment of the signaling path, while communication unit 4002 may connect the signaling node 4000 towards the call destination segment of the signaling path. The communication unit 4005 may be embodied as an incoming protocol handler of the BICC protocol (i.e., as a protocol handler for handling incoming BICC call setup messages), and communication unit 4002 may be embodied as an outgoing protocol handler outgoing BICC call setup messages.

With regard to the handling of excessive delay indication signals, communication unit 4002 receives an excessive delay indication signal from the call destination domain, and communication unit 4005 sends an excessive delay indication signal towards the call originating domain. The signaling node 4000 further comprises timer 4006 for supervising excessive delay indication signals, message generator 4004, and optionally, message memory 4001. Controller 4003 controls and coordinates timer 4006, communication units 4005 and 4002, message generator 4004, and message memory 4001.

At operation of the signaling node 4000, controller 4003 initiates sending a first excessive delay indication signal by the communication unit 4005. The excessive delay indication signal may be generated previously within the message generator, or, alternatively be previously received in the communication unit 4002 and stored in the message memory 4001. The controller is adapted to start the timer 4006 when the first excessive delay indication signal is sent. Furthermore, the controller is adapted to monitor the timer and to refrain from sending excessive delay indication signals until timer 4006 expires. To that end, the controller 4003 is adapted to handle further excessive delay indication signals received from the communication unit 4002 by ignoring at least two of them, or by storing one further excessive delay indication signal in the message memory 4001 and ignoring further excessive delay indication signals. Alternatively or in addition, the reception of the excessive delay indication signal may be memorized by setting a flag indicating the reception.

When controller 4003 detects the expiration of the timer 4006, and previous excessive delay indication signals have been received, the controller is adapted to send a single excessive delay indication signal by the communication unit 4005 towards the call origin. To this end, the communication unit may either instruct the message generator 4004 to generate an excessive delay indication signal or fetch a previously stored excessive delay indication signal from the message memory 4001.

Alternatively, the controller 4003 may be adapted to enter a mode of operation in which further excessive delay indication signals are ignored as long as timer 4006 has not expired. When the timer 4006 expires, controller 4003 switches to a mode of operation during which excessive delay messages are not ignored. Thus, a next excessive delay indication signal received from the communication unit 4002 is forwarded to the communication unit 4005 to be sent towards the call origin. Upon sending the next excessive delay indication signal, the timer 4006 is restarted, and the controller 4003 proceeds with handling excessive delay indication signals as above described.

Figure 5:
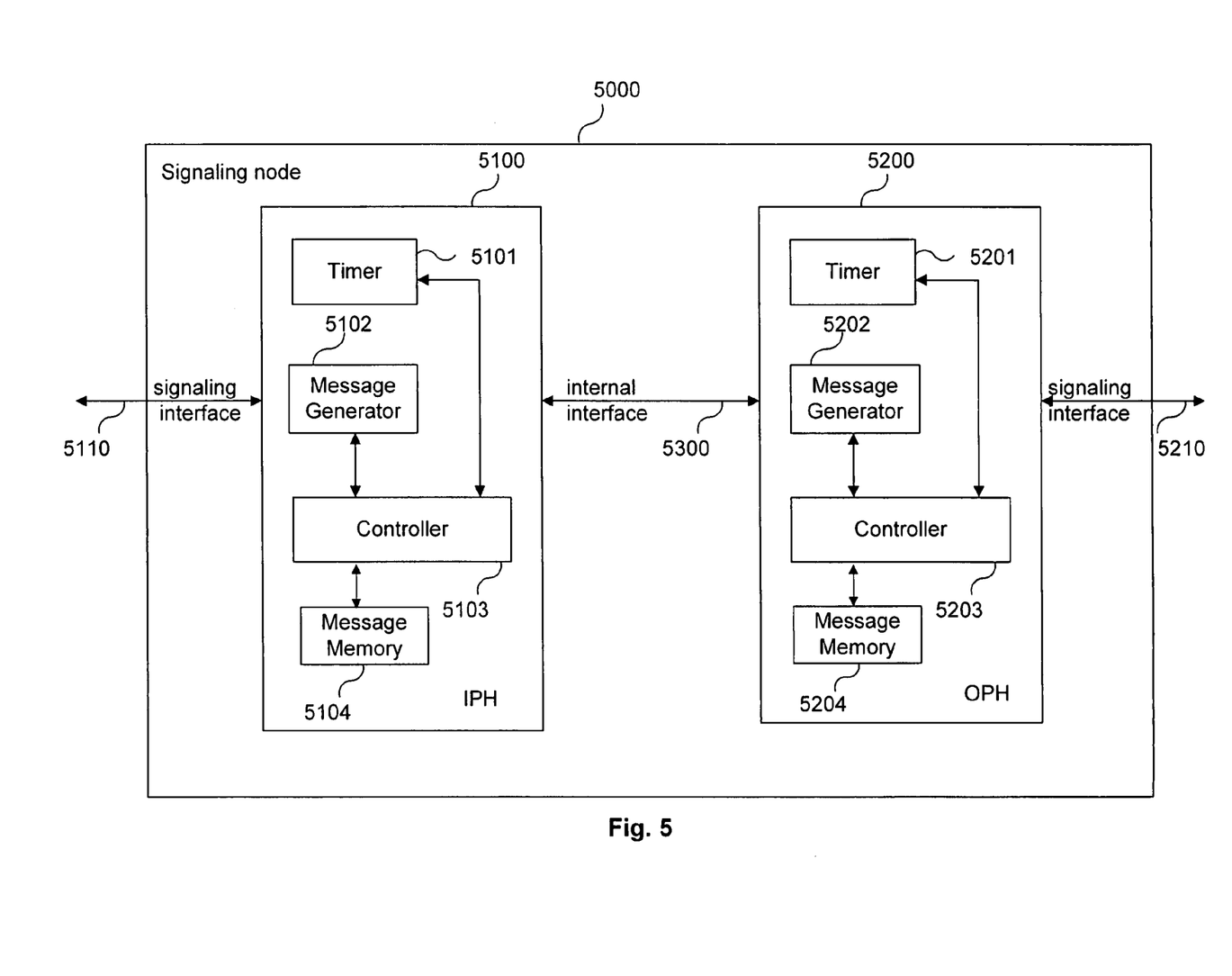
FIG. 5 is a block diagram depicting a further embodiment of a signaling node in accordance with the teachings of the present invention.

Reference is now made to FIG. 5 illustrating a block diagram of a further signaling node 5000 embodied to perform the method of FIG. 3. The signaling node 5000 comprises an incoming protocol handler 5100 and an outgoing protocol handler 5200, for connecting the signaling node 5000 within a signaling route from a call origin to a call destination. Thus, when connected within a communication network, incoming protocol handler 5100 receives call setup signals from a call origin, and outgoing protocol handler 5200 transmits call setup signals towards the call destination.

Incoming protocol handler 5100 is connectable towards a call origin via signaling interface 5110, and correspondingly, outgoing protocol handler 5200 is connectable towards a call destination via signaling interface 5210. Within the signaling node 5000, incoming protocol handler 5100 and outgoing protocol handler 5200 are connected via internal interface 5300.

With regard to the handling of excessive delay indication signals, outgoing protocol handler 5200 handles excessive delay indication signals originating from the call destination, and incoming protocol handler 5100 handles excessive delay indication signals destined for the call origin.

Each of the incoming and outgoing protocol handlers 5100 and 5200 include a timer, a message generator, a controller, and, optionally, a message memory. More specifically, incoming protocol handler 5100 includes a timer 5101, a controller 5103, a message generator 5102, and optionally a message memory 5104. Outgoing protocol handler 5200 includes a timer 5201, a controller 5203, a message generator 5202, and optionally, a message memory 5204.

At operation of the signaling node 5000, the controller 5103 sends a first excessive delay indication signal. The excessive delay indication signal may be previously generated within the message generator 5102, may be previously generated in the message generator 5202 and transmitted via the internal interface 5300, or may be received from the call origin via the signaling interface 5210 and forwarded via the internal interface 5300.

The controller 5103 is adapted to start the timer 5101 responsive to sending the first excessive delay indication signal. Furthermore, the controller 5103 is adapted to monitor the timer 5101 and to refrain from sending excessive delay indication signals until the timer 5101 expires. To that end the controller 5103 is adapted to ignore at least one of them. After the timer 5101 has expired, the controller 5103 may resume sending excessive delay indication signals.

An excessive delay indication message may be created in the message generator in response to an expiration of the timer 5101, and may be sent via the signaling interface 5110. Alternatively, an excessive delay indication signal previously received and stored within the message memory 5104 by the controller 5103 may be retrieved and forwarded via the signaling interface 5110 upon detecting the expiration of the timer 5101.

Figure 6:
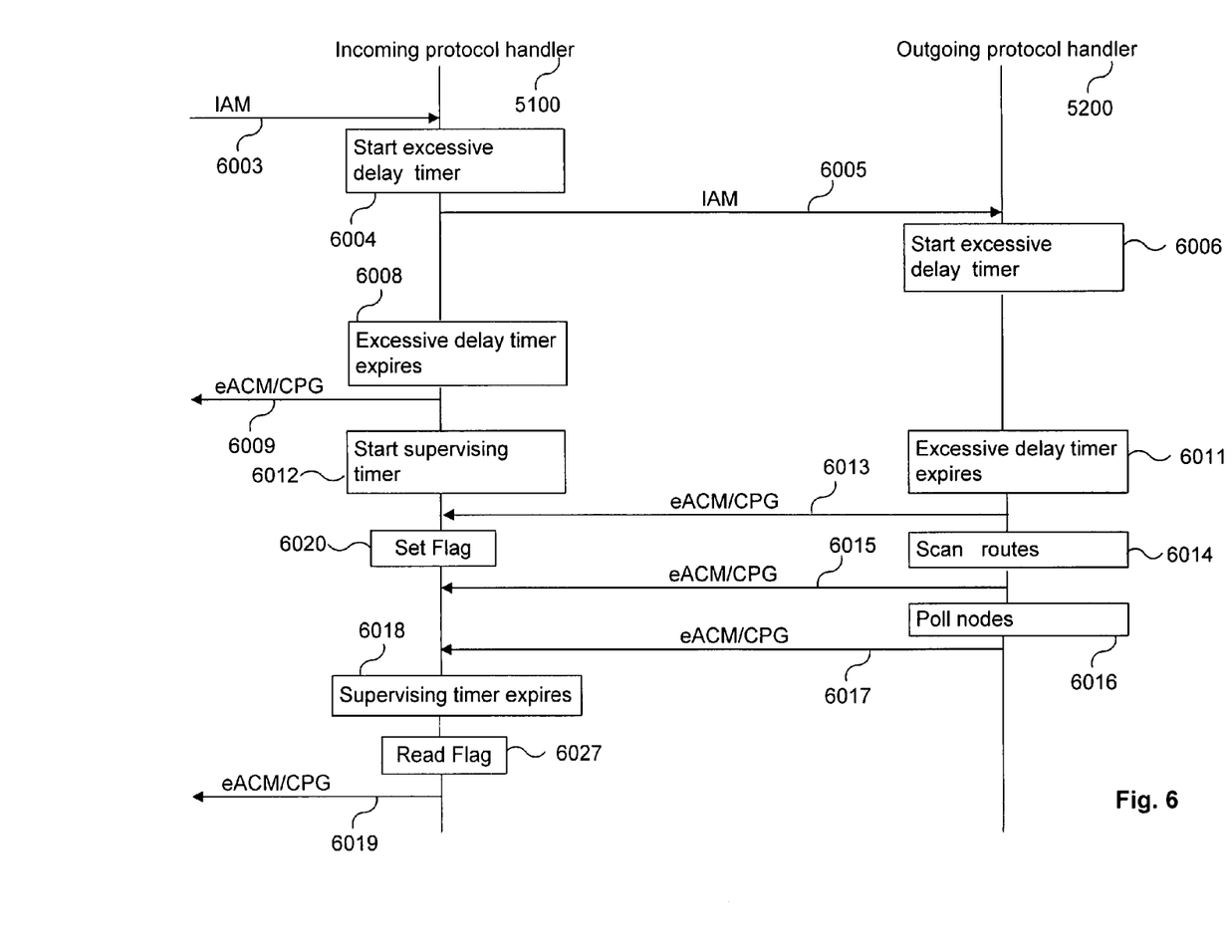
FIG. 6 is a signal sequence diagram in accordance with the teachings of the present invention.

Reference is now made to FIG. 6 depicting a signaling sequence diagram that involves instances of the signaling node 5000 and may be executed therein. In particular, the embodiment of FIG. 6 depicts processing steps and messages processed by the incoming protocol handler 5100 and the outgoing protocol handler 5200 of FIG. 5. In the embodiment of FIG. 6, the incoming and outgoing protocol handlers 5100 and 5200 are BICC protocol handlers.

The signaling sequence of FIG. 6 commences with a BICC IAM message 6003 being received in the incoming protocol handler 5100. Upon reception of the IAM message 6003, the incoming protocol handler 5100 starts its excessive delay timer at step 6004 and forwards the IAM 6005 to the outgoing protocol handler. The outgoing protocol handler, in turn, starts its excessive delay timer in step 6006. When the excessive delay timer in the incoming protocol handler 5100 expires at step 6008, incoming the protocol handler 5100 generates an excessive delay indication signal 6009. The excessive delay indication signal 6009 may be embodied as an eACM message or a CPG message depending, as previously described, on whether excessive delay indication signal 6009 is a first excessive delay indication signal, or not.

Upon sending the excessive delay indication signal 6009, incoming protocol handler 5100 starts a timer for supervising excessive delay indication signals at step 6012. When the outgoing protocol handler determines at step 6011 that its excessive delay timer has expired, the outgoing protocol handler generates an excessive delay indication signal 6013 and sends it to the incoming protocol handler 5100. In response, the incoming protocol handler 5100 sets a flag in step 6020 to memorize that the excessive delay indication signal 6013 has been received.

The outgoing protocol handler 5200 proceeds with the call setup and initiates a scanning operation on potential transmission routes at step 6014. When scanning operation 6014 lasts excessively long and the scanning timer expires, the outgoing protocol handler 5200 generates and forwards a further excessive delay indication signal 6015 to the incoming protocol handler 5100. When further proceeding with the call setup, the outgoing protocol handler 5200 performs a polling operation on potential transmission nodes in step 6016 and issues a further excessive delay indication signal 6017 towards the incoming protocol handler 5100, when the polling operation lasts excessively long and the polling timer expires.

The incoming protocol handler refrains from immediate forwarding of the excessive delay indication signals 6013, 6015, and 6017. Instead, the incoming protocol handler detects the expiration of the supervising timer in step 6018, and, in response, reads the flag indicating whether an excessive delay indication has been received within the runtime of the supervising timer in step 6027. If the flag is set, indicating that an excessive delay indication signal has actually been received, a single excessive delay indication signal 6019 is transmitted towards the call origin. As described above with reference to FIGS. 4 and 5, the single excessive delay indication signal may either be generated when it is needed or fetched from a signal memory, where it has been previously stored. Upon sending the excessive delay indication signal 6019, advantageously the supervising timer is restarted and the procedure continues according to step 6012. When the reading step 6027 results in detecting that no flag has been set, no excessive delay indication signal 6019 is transmitted and the supervision timer is advantageously not restarted at expiration but when another excessive delay indication has been received.

Figure 7:
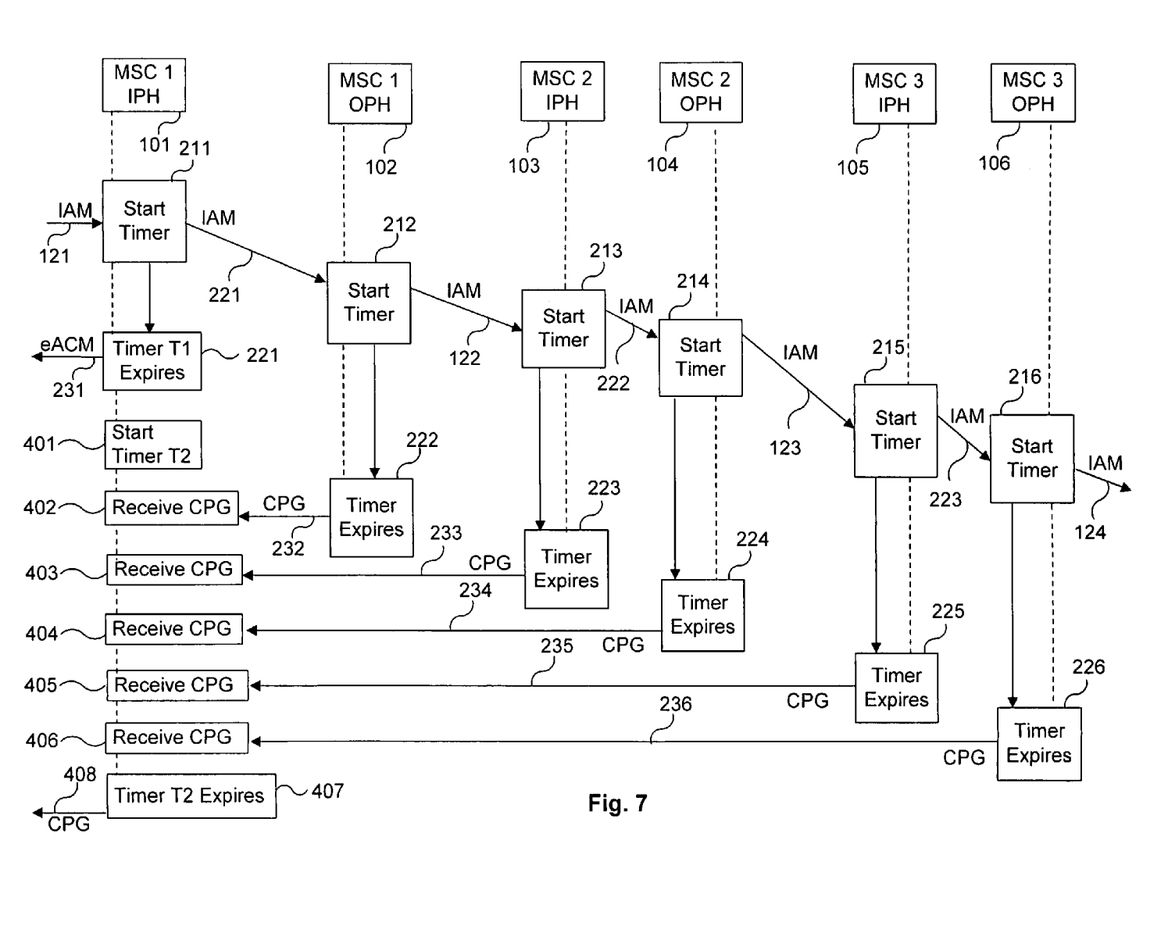
FIG. 7 is a signal sequence diagram illustrating the handling of excessive delay indication signals in the network of FIG. 1 in accordance with the teaching of the present invention.

Referring now to FIG. 7 a signaling sequence diagram in accordance with the present invention is depicted. The signaling sequence diagram of FIG. 7 involves processing steps and signals that correspond to equally labeled processing steps and transmitted signals of the signaling sequence diagram of FIG. 2. For purpose of conciseness, the description of the processing steps and signals is referred to rather than repeated.

The signaling sequence of FIG. 7 is adapted with regard to the signaling sequence of FIG. 2 in that the incoming protocol handler 101 performs a modified handling of excessive delay indication signals in order to prevent unnecessary sending of excessive delay indication signals. The modified handling of the excessive delay indicating signals involves a filtering operation on excessive delay indicating messages that may be implemented in a plurality of transmission nodes. For the purpose of conciseness, the implementation of the filtering operation on a selected incoming protocol handler, i.e. the incoming protocol handler 101, is depicted.

In particular, the signaling sequence of FIG. 7 is adapted, in that a supervision timer is started at step 401 in response to sending the excessive delay indication signal 231. The signaling sequence of FIG. 7 is further adapted in that the incoming protocol handler 101 refrains from immediate forwarding of the excessive delay indication signals 232-236 that are received during the runtime of the supervision timer. Instead, the incoming protocol handler receives the excessive delay indication signal at step 402, and sets a flag indicating the reception. In addition, step 402 may include storing the excessive delay indication signal 232, or alternatively, discarding the excessive delay indication signal 232. The incoming protocol handler 101 receives the further delay indication signals 233-236 during the runtime of the supervising timer, and when accessing the flag set in step 402, determines that a previous excessive delay indicating signal has been received and that the succeeding excessive delay indicating signals 233-236 may be discarded.

When the supervising timer expires at step 407, the incoming protocol handler accesses the flag set in step 402 and determines that a delay indication signal has been previously received during the runtime of the supervision timer and that a delay indication signal should be sent towards the call origin. Accordingly, depending on whether an excessive delay indication signal has been previously stored or a flag indicating the previous reception of a delay indication signal has been set, excessive delay indication signal 408 is either retrieved from a message memory or generated and transmitted towards the call origin. Thus, the single excessive delay indication signal 408 replaces the previous delay indication signals 232-236. Upon sending of the excessive delay indication signal 408, timer T2 is restarted, and the operation of the incoming protocol handler continues according to step 401. When reading of the flag results in determining that no excessive delay indication signal has been received during the runtime of timer T2, no excessive delay indication is sent and timer T2 is advantageously not restarted at expiration but when another excessive delay indication has been received.

Advantageously the expiration time of the supervision timer that supervises the time interval between excessive delay indication signals is configured to be shorter than the expiration time of the timer in the call originating node 101, which supervises the call setup duration. In that manner, the single excessive delay indication may be sent early enough to prevent the expiration of the supervision timer of the call setup.

What is claimed is:

1. A method of reducing signaling during call setup in a communication network having an intermediate node on a signaling path between a first node and a second node, said method being performed in the intermediate node and comprising:

sending a first excessive delay indication signal to the first node;

starting a timer for supervising excessive delay indication signals from the second node;

prior to expiration of the timer, receiving at least two additional excessive delay indication signals from the second node without performing any signaling toward the first node; and after expiration of the timer, sending a single excessive delay indication signal to the first node.

2. The method of claim 1, wherein the intermediate node and the second node are implemented in a common node.

3. The method of claim 2, wherein the second node is a protocol handler.

4. The method of claim 1, wherein the step of sending the first excessive delay indication signal to the first node includes generating the first excessive delay indication signal in the intermediate node.

5. The method of claim 1, wherein the step of sending a first excessive delay indication signal to the first node includes forwarding the first excessive delay indication signal received from the second node.

6. The method of claim 1, wherein the step of sending a single excessive delay indication signal to the first node after expiration of the timer includes generating the single excessive delay indication signal in the intermediate node.

7. The method of claim 1, wherein the step of sending a single excessive delay indication signal to the first node after expiration of the timer includes forwarding a next excessive delay indication signal received from the second node after the timer expires.

8. The method of claim 1, wherein the first node includes a call setup timer having an expiration period, and the step of starting a timer for supervising excessive delay indication signals in the intermediate node includes starting a timer with an expiration period shorter than the expiration period of the call setup timer in the first node.

9. The method of claim 1, wherein the step of receiving at least two additional excessive delay indication signals from the second node without performing any signaling toward the first node includes:
   setting a flag when a first excessive delay indication signal is received from the second node; and
   discarding any additional excessive delay indication signals received from the second node prior to expiration of the timer;
   wherein, after expiration of the timer, the intermediate node sends the single excessive delay indication signal to the first node only if the flag has been set.

10. A method of reducing signaling during call setup in a communication network having an intermediate node on a signaling path between a first node and a second node, said method being performed in the intermediate node and comprising:
   receiving a first excessive delay indication signal from the second node;
   forwarding the first excessive delay indication signal to the first node;
   receiving at least one additional excessive delay indication signal from the second node; and
   discarding the at least one additional excessive delay indication signal;
   wherein signaling is reduced in the network by reducing the number of excessive delay indication signals sent from the intermediate node to the first node.

11. A signaling node for reducing signaling during call setup in a communication network, wherein the signaling node is an intermediate node on a signaling path between a first node and a second node, the signaling node comprising:
   means for sending a first excessive delay indication signal to the first node;
   a timer for supervising excessive delay indication signals from the second node;
   means for starting the timer;
   means for receiving, prior to expiration of the timer, at least two additional excessive delay indication signals from the second node without performing any signaling toward the first node; and
   means for sending a single excessive delay indication signal to the first node after expiration of the timer.

12. The signaling node of claim 11, being implemented with the second node on a common node.

13. The signaling node of claim 12, wherein the second node is a protocol handler.

14. The signaling node of claim 11, wherein the means for sending the first excessive delay indication signal to the first node includes means for generating the first excessive delay indication signal.

15. The signaling node of claim 11, wherein the means for sending the first excessive delay indication signal includes means for forwarding the first excessive delay indication signal received from the second node.

16. The signaling node of claim 11, wherein the means for sending a single excessive delay indication signal to the first node after expiration of the timer includes means for generating the single excessive delay indication signal.

17. The signaling node of claim 11, wherein the means for sending a single excessive delay indication signal to the first node after expiration of the timer includes means for forwarding a next excessive delay indication signal received from the second node after the timer expires.

18. The signaling node of claim 11, wherein the first node includes a call setup timer having an expiration period, and wherein the means for starting a timer for supervising excessive delay indication signals includes means for starting a timer with an expiration period shorter than the expiration period of the call setup timer in the first node.

19. The signaling node of claim 11, wherein the means for receiving at least two additional excessive delay indication signals from the second node without performing any signaling toward the first node includes:
   means for setting a flag when a first excessive delay indication signal is received from the second node; and
   means for discarding any additional excessive delay indication signals received from the second node prior to expiration of the timer;
   wherein, the means for sending the single excessive delay indication signal to the first node after expiration of the timer includes means for sending the single excessive delay indication only if the flag has been set.

20. A signaling node for reducing signaling during call setup in a communication network, wherein the signaling node is an intermediate node on a signaling path between a first node and a second node, the signaling node comprising:
   means for receiving a first excessive delay indication signal from the second node;
   means for forwarding the first excessive delay indication signal to the first node;
   means for receiving at least one additional excessive delay indication signal from the second node; and
   means for discarding the at least one additional excessive delay indication signal;
   wherein signaling is reduced in the network by reducing the number of excessive delay indication signals sent from the signaling node to the first node.

21. A communication network with reduced signaling during call setup, comprising:
   a first node for originating a call;
   a second node for terminating the call; and
   an intermediate node on a signaling path between the first node and the second node, said intermediate node including:
      means for sending a first excessive delay indication signal to the first node;

a timer for supervising excessive delay indication signals from the second node;

means for starting the timer;

means for receiving, prior to expiration of the timer, at least two additional excessive delay indication signals from the second node without performing any signaling toward the first node; and means for sending a single excessive delay indication signal to the first node after expiration of the timer.

22. The communication network of claim 21, wherein the means within the intermediate node for receiving at least two additional excessive delay indication signals from the second node without performing any signaling toward the first node includes:

means for selling a flag when a first excessive delay indication signal is received from the second node; and means for discarding any additional excessive delay indication signals received from the second node prior to expiration of the timer;

wherein the means within the intermediate node for sending the single excessive delay indication signal to the first node after expiration of the timer includes means for sending the single excessive delay indication only if the flag has been set.

23. A communication network with reduced signaling during call setup, comprising:

a first node for originating a call;

a second node for terminating the call; and an intermediate node on a signaling path between the first node and the second node, said intermediate node including:

means for receiving a first excessive delay indication signal from the second node;

means for forwarding the first excessive delay indication signal to the first node;

means for receiving at least one additional excessive delay indication signal from the second node; and means for discarding the at least one additional excessive delay indication signal;

wherein signaling is reduced in the network by reducing the number of excessive delay indication signals sent from the signaling node to the first node.

* * * * *